(12) United States Patent
Tolstikhin et al.

(10) Patent No.: US 7,444,055 B2
(45) Date of Patent: Oct. 28, 2008

(54) INTEGRATED OPTICS ARRANGEMENT FOR WAVELENGTH (DE)MULTIPLEXING IN A MULTI-GRADE VERTICAL STACK

(75) Inventors: Valery Tolstikhin, Ottawa (CA); Yury Logvin, Ottawa (CA); Kirill Pimenov, Ottawa (CA)

(73) Assignee: OneChip Photonics Inc., Ottawa, Ontario (CA)

( * ) Notice: Subject to any disclaimer, the term of this patent is extended or adjusted under 35 U.S.C. 154(b) by 0 days.

(21) Appl. No.: 11/984,759

(22) Filed: Nov. 21, 2007

(65) Prior Publication Data

US 2008/0138008 A1 Jun. 12, 2008

Related U.S. Application Data

(60) Provisional application No. 60/860,221, filed on Nov. 21, 2006.

(51) Int. Cl.
*G02B 6/10* (2006.01)
*H04J 14/02* (2006.01)
*H01L 21/82* (2006.01)

(52) U.S. Cl. ............... 385/131; 385/14; 385/129; 385/130; 385/24; 385/141; 398/79; 398/82; 398/83; 438/29; 438/31

(58) Field of Classification Search ............ 385/14, 385/24, 122, 31, 37, 42, 129, 130, 131, 132, 385/141; 398/48, 49, 79, 82, 83, 84; 438/29, 438/31

See application file for complete search history.

(56) References Cited

U.S. PATENT DOCUMENTS 5,805,755 A * 9/1998 Amersfoort et al. ......... 385/131

(Continued)

OTHER PUBLICATIONS

Menon, Vinod M. et al; "Photonic Integration Using Asymmetric Twin-Waveguide (ATG) Technology"; IEEE Journal of Selected Topics in Quantum Electronics, vol. 11, No. 1, Jan./Feb. 2005, pp. 30-42.

(Continued)

*Primary Examiner*—Brian M Healy
(74) *Attorney, Agent, or Firm*—Gordon Freedman; Freedman & Associates

(57) ABSTRACT

The invention describes an integrated-photonics arrangement, implementable in a multi-guide vertical integration structure composed from III-V semiconductors and grown in one epitaxial growth run, that allows for vertical and lateral splitting of optical signals co- or bi-directionally propagating in the common passive waveguide into plurality of the vertically integrated passive or active wavelength-designated waveguides, therefore, enabling the wavelength-designated waveguides operating in different wavelengths to be monolithically integrated onto the same substrate and connected to the shared passive waveguide. In the exemplary embodiments of the invention, two active wavelength-designated waveguides, each of which either laser or photodetector, are vertically integrated with a common passive waveguide connected to the input/output optical port shared by both operating wavelengths, to form a single-fiber, two-wavelength receiver (both wavelength-designated waveguides are waveguide photodetectors) or transmitter (both wavelength-designated waveguides are edge-emitting semiconductor injection lasers) or transceiver (one wavelength-designated waveguide is waveguide photodetector and the other—edge-emitting semiconductor injection laser). Advantageously to the previous art, the proposed vertical splitting and lateral routing allows for a reduced footprint size while greatly improving design flexibility and/or device performance.

24 Claims, 7 Drawing Sheets

U.S. PATENT DOCUMENTS

| | | | |
|---|---|---|---|
| 6,640,034 B1* | 10/2003 | Charlton et al. | 385/122 |
| 6,901,194 B2* | 5/2005 | Charlton et al. | 385/122 |
| 7,095,938 B2* | 8/2006 | Tolstikhin | 385/131 |
| 2003/0026515 A1* | 2/2003 | Barenburg et al. | 385/14 |
| 2004/0096175 A1* | 5/2004 | Tolstikhin | 385/131 |
| 2006/0078254 A1* | 4/2006 | Djordjev et al. | 385/32 |

OTHER PUBLICATIONS

Balmer, R.S., et al.; "Vertically Tapered Epilayers for Low-loss Waveguide-fiber Coupling Achieved in a Single Epitaxial Growth Run", Journal of Lightwave Technology, vol. 21, No. 1, Jan. 2003; pp. 211-217.

* cited by examiner

US 7,444,055 B2

INTEGRATED OPTICS ARRANGEMENT FOR WAVELENGTH (DE)MULTIPLEXING IN A MULTI-GRADE VERTICAL STACK

This application claims the benefit of U.S. Provisional Patent Application No. 60/860,221 filed Nov. 21, 2006, the entire contents of which are incorporated herein by reference.

FIELD OF THE INVENTION

The invention relates generally to the field of integrated photonics, and more particularly to wavelength division multiplexing (WDM) in photonic integrated circuits (PICs) in III-V compound semiconductor materials.

BACKGROUND OF THE INVENTION

In recent years, we have been witnessing a rapid advancement of the optical access and local area networks driven by ever growing bandwidth demand, and fundamental inability of the competing technologies, e.g. those based on twisted copper, coaxial cable or wireless transmission, to deliver. Transmission over optical fiber is emerging as a universal means for communications, from long-haul to metropolitan area to broadband access networks, resulting in an explosion of optical Internet and convergence of different media streams (e.g. data, voice, and video) into Internet Protocol data delivered in the optical domain right to the end user. This is a future proof solution to the "last mile" bottleneck, which not only dramatically increases the network capacity, but also eliminates costly transitions from optical into electrical domain (and vise versa).

Deep penetration of the optical fiber into the access networks requires an unparalleled massive deployment of the optical gear that drives the traffic to and from the Internet users. For example, optical transceivers, which receive downstream signals on one wavelength and send upstream signals on another wavelength, both wavelengths sharing the same optical fiber, have to be deployed at every optical line terminal (OLT)/network unit (ONU). Therefore, cost efficiency and volume scalability in manufacturing of such components are increasingly becoming the major issues. It is broadly accepted across the industry that the optical Internet is not going to become a commodity service, until volume manufacturing of the optical transceivers and other massively deployed optical components reaches the cost efficiency and scalability levels of consumer products.

Within a framework of the current optical component manufacturing paradigm, which is based mainly on bulk optical sub-assemblies (OSA) from off-the-shelf discrete passive and active photonic devices, the root cause of the problem is in a labor-intensive optical alignment and costly multiple packaging. Not only do these limit the cost efficiency, but also significantly restrict the manufacturer's ability of ramping volume and providing scalability in manufacturing. The solution is in reducing the optical alignment and packaging content in the OSA and, eventually, replacing the optical assemblies with photonic integrated circuit (PIC) technologies, in which all the functional elements of optical circuit are monolithically integrated onto the same substrate. Then, the active optical alignment by hand is replaced by automated passive alignment, defined by means of lithography, and multiple packaging is eliminated altogether, enabling for an automated and volume-scalable mass production of the complex optical components, based on existing planar technologies and wafer fabrication techniques.

In the context of applications, the materials of choice for monolithic PICs for use in the optical transmission systems remain indium phosphide (InP) and related III-V semiconductors, since they, uniquely, allow for active and passive devices operating in the spectral ranges of interest for optical telecommunications to be combined onto the same InP substrate. In particular, InP PICs, perhaps, are the best hope for a cost-efficient and volume-scalable solution to the most massively deployed components: optical transceivers for the access passive optical networks operating in 1.3 µm (upstream) and 1.5 µm (downstream) wavelength ranges, see for example V. Tolstikhin ("Integrated Photonics: Enabling Optical Component Technologies for Next Generation Access Networks", Proc. Asia Optical Fiber Communication & Optoelectronic Exposition & Conference, October 2007).

In the PIC, function of every semiconductor waveguide device is pre-determined by its band structure, and, more particularly, bandgap wavelength of its guiding layer. Therefore, functionally diverse devices must be made from different, yet compatible, semiconductor materials. This is a fundamental requirement, and one that has a profound impact on the PIC design and fabrication. Integration of multiple functionalities in the PIC can be achieved in several ways varied by their design flexibility and/or fabrication complexity. Multi-guide vertical integration (MGVI) technique, in which the optical waveguides of different functionality (hence composed from different materials) are monolithically integrated one above the other in a process of epitaxial growth and coupled through evanescent fields of their optical modes, is one such technique. It is flexible, because of different optical waveguides are vertically separated and hence their guiding layers may be designed independently. Still, it is relatively easy to manufacture, since the multi-functional PIC can be fabricated by using only one epitaxial growth step and standard semiconductor fabrication processes. A combination of the design flexibility and suitability for a cost-efficient wafer fabrication makes MGVI an attractive versatile integration technique for mass production of highly functional, inexpensive optical components.

On a flip side, the design of PICs based on the MGVI platform is challenging because of a necessity for organizing of functionally different waveguide elements at different vertical levels of the MGVI structure into a common optical circuit, through a controllable transition of the optical signals between vertically stacked optical waveguides. The problem is further complicated then the PIC operates in a plurality of wavelengths, each of which is generated or processed or detected in its designated waveguide at a certain vertical level of the MGVI structure and yet all the wavelengths share the same input/output optical port. In particular, there is a need for a waveguide arrangement, hereafter referred to as a vertical wavelength (de)multiplexer (VWM), that allows for vertically combining and splitting the optical signals in the different wavelength ranges, such that, in use, signals in each particular wavelength range are transitioned from the wavelength-designated (common) input waveguide into the common (this wavelength designated) output waveguide without significantly interacting with the other wavelength-designated waveguides. Additionally, it should be compact, compliant to the PIC performance requirements and tolerant to the variations of the fabrication processes.

Early designs of what could be qualified as a VWM were based on a twin-waveguide structure, originally proposed by Suematsu et al ("Integrated Twin-Guide AlGaAs Laser with Multiheterostructure", IEEE J. Quantum Electron., Vol. 11, pp. 457-460, 1975). This is essentially a directional coupler arrangement, in which a thin transparent layer separates two waveguides, such that, in use, optical signal of a particular wavelength and polarization is completely transferred between the two over a predetermined propagation distance, specific to the wavelength and polarization of the optical signal. Whilst very simple, this design suffers from a relatively narrow operating wavelength range and high polarization sensitivity, both related to the resonant-coupling mechanism of the transfer between the vertically stacked waveguides.

More recently, the idea of using the wavelength-selective directional coupler for a vertical wavelength splitting has received further consideration and been advanced based upon mainly resonant coupling techniques, such as resonant grating-assistant coupling (e.g. R. C. Alferness et al., "Grating-assisted InGaAsP InP vertical co-directional coupler filter", Appl. Phys. Lett., Vol. 55, P. 2011, 1989) or resonant evanescent-field coupling. Resonant evanescent-field coupling technique itself can be sub-divided into solutions using planar waveguides (e.g. V. Magnin et al, "Design and Optimization of a 1.3/1.55-μm Wavelength Selective p-i-n Photodiode Based on Multimode Diluted Waveguide", IEEE Photon. Technol. Lett., Vol. 17, No. 2, pp. 459-461, 2005), straight ridge waveguides (e.g. C. Wu, et al., "A Vertically Coupled InGaAsP/InP Directional Coupler Filter of Ultra-narrow Bandwidth", IEEE Photon. Technology Lett., Vol. 3, No. 6, pp. 519-521, 1991) and tapered ridge waveguides (e.g. C.-W. Lee et al., "Asymmetric Waveguides Vertical Couplers for Polarization-Independent Coupling and Polarization-Mode Splitting", J. Lightwave Technol., Vol. 23, No. 4, pp. 1818-1826, 2005).

Analysis of the resonant grating-assisted designs shows that these are suitable only for narrow wavelength passband applications and require that the grating is formed in the layer(s) separating the vertically integrated waveguides. This precludes the use of a one step epitaxial growth, a significant benefit of the vertical integration platform, which allows for high yield and low cost approach to manufacturing components on III-V semiconductor materials.

In the resonant evanescent-field coupling designs, the transfer between vertically integrated waveguides occurs at a pre-determined distance along the propagation axis, this position being specific to the wavelength and polarization of the optical signal. This dramatically limits a designers' freedom for designing a fully functional photonic circuit but also limits the resonant evanescent-field coupling designs only to the narrow passband applications.

Additionally, any narrow wavelength passband design requires tight fabrication tolerances, as even a minor variation of the epitaxial structure or/and layout of the device may result in a shift of centre wavelength beyond a specified passband and rendering the component useless for the intended application. This may reduce the fabrication yields and, therefore, increase the manufacturing costs of performance compliant PIG components.

Most recently, a generic approach to the VWM design suitable for applications within the MGVI platform has been proposed by V. Tolstikhin et al ("Integrated Vertical Wavelength (De)Multiplexer" U.S. patent application Ser. No. 11/882,126). Pending in this previous art, an integrated VWM operates on a principle of a lateral taper assisted adiabatic transition between a common waveguide and a plurality of wavelength-designated waveguides. All of the waveguides are vertically integrated one above the other and positioned one after the other in the order of ascending the bandgap wavelength of their guiding layers (hereafter referred to as the "bandgap wavelength"), such that the common waveguide is at the bottom of the MGVI structure and the designated waveguide corresponding to the longest bandgap wavelength is at the top of the MGVI structure. For every wavelength from the plurality of wavelengths sharing the common waveguide, wave impedance matching between this common and wavelength-designated waveguides occurs at a certain predetermined distance, such that, in use, the longer wavelengths propagate further in the common waveguide, prior to being adiabatically transferred into their designated waveguides. This is achieved through manipulating the multi-step lateral tapers, defined at each waveguide level and coherently adjusted one to the other in order to change the waveguide effective indices or, in other words, wave impedance of the waveguides, in a certain pre-determined way.

Whereas it is a generic, compact and easy to manufacture VWM design to use in the PICs based on MGVI platform, the integrated waveguide arrangement above has an inherent limitation in that the multi-step lateral tapers, a crucial element of this design needed for a controllable wave impedance change along the propagation direction, may not be necessarily compatible with the desired layout of the wavelength-designated waveguide(s) on which they are to be formed. It would be advantageous, therefore, to provide a solution that removed the constraints of this prior art by offering increased design flexibility within the MGVI platform. This would further advance it as a versatile PIC platform, based on one-step epitaxial growth and standard semiconductor fabrication processes.

OBJECT OF THE INVENTION

The object of the invention is the VWM design within the MGVI platform for a controllable, non-resonant adiabatic transition of the optical signals in a plurality of wavelength ranges (for a simplicity, hereafter referred to as "wavelengths"), which co- or bi-directionally propagate in the common waveguide, into/from a plurality of the wavelength-designated waveguides without any significant interaction with the other waveguides, such that, in use, the common and designated waveguides all are formed at different guiding layers of the same MGVI structure, monolithically integrated onto the same semiconductor substrate in one epitaxial growth step and yet optimized independently from each other.

SUMMARY OF THE INVENTION

In accordance with the invention, the VWM comprises a semiconductor substrate, an epitaxial semiconductor structure grown on this substrate in one growth step, a common waveguide with the bandgap wavelength well below any operating wavelength and a plurality of the wavelength-designated waveguides with different bandgap wavelengths, all the waveguides formed in this epitaxial structure, vertically integrated one above the other and positioned one after the other in the order of ascending the bandgap wavelength, therein at least one wavelength-designated waveguide equipped with a lateral router to laterally re-direct the optical signal in its corresponding wavelength away from the optical track shared by other wavelengths and, therefore, allow for independent design and optimization of the layout of this (these) designated waveguide(s), such that, in use; the optical signals in a plurality of the wavelength ranges can be efficiently transitioned between the common and a plurality of designated waveguides without any significant interacting with the other designated waveguides or compromising the performance of this (these) particular designated waveguide(s).

In the VWM disclosed herein, the transition of guided light from a common waveguide into a wavelength-designated waveguide featuring lateral re-direction occurs in two consecutive steps. In the first step, the optical signal in a wavelength from a plurality of wavelengths sharing the common waveguide is vertically transitioned from this waveguide into the guiding layer of its designated waveguide. Similarly to the teachings of the previous art, see V. Tolstikhin et al ("Integrated Vertical Wavelength (De)Multiplexer" U.S. patent application Ser. No. 11/882,126), the design control over such a transition is achieved by using the multi-step lateral tapers, defined at each guiding level within a MGVI structure and designed to ensure the wave impedance matching between the common and the wavelength-designated waveguide at a certain predetermined distance along the propagation direction, which is shorter for the shorter wavelength and longer for the longer wavelength from a plurality of the operating wavelengths. In the second step, the optical signal in a specific wavelength, already vertically confined in the guiding layer of its designated waveguide, is laterally re-directed towards this waveguide, by using elements such as waveguide bends, turning mirrors, corner reflectors, or any other suitable waveguide arrangement available to the PIC designer.

In a similar fashion, the transition of the optical signals in a plurality of wavelengths from a plurality of their designated waveguides into the common waveguide also occurs in two consecutive steps, first by lateral re-directing the optical signals while continuing to vertically confine them in the corresponding guiding layers of the MGVI structure and, second, by vertical transitioning the optical signals from their designated guiding layers of the MGVI structure to the common waveguide.

The common waveguide in a VWM is always a passive waveguide having its bandgap wavelength well below any operating wavelength of the optical signals propagating within the VWM. As it concerns to the designated waveguides, these can be both passive (designated wavelength significantly shorter than the bandgap wavelength) or active (designated wavelength close to or above the bandgap wavelength) waveguides or any combination of the passive and active waveguides. Usually, passive waveguide serves to connect an input/output optical port of the PIC to other parts of the PIC, but it also may be a part of another integrated photonic circuit arrangement, such as a directional coupler or any kind of planar (de)multiplexer, which does not require optical-electrical or electrical-optical conversion for its operation. Usually, an active waveguide, which typically includes a PIN heterostructure with the narrower bandgap intrinsic region simultaneously acting as a guiding layer of the optical waveguide, oppositely, serves to provide optical-electrical or electrical-optical conversion, such as generation (a laser) or detection (a photodetector) of the optical signals.

In a case when a wavelength-designated waveguide featuring lateral re-direction is a passive waveguide, the lateral router can be formed on the same guiding layer of the MGVI structure as the designated waveguide in question. However, in a case when a wavelength-designated waveguide is an active waveguide, this may result in unacceptably high insertion loss in the lateral router. In such a case, it would be advantageous to have the guiding layer of the designated waveguide composed of two vertically stacked guiding layers, each capable of supporting the vertically confined optical mode centered in this layer, of which the lower one is transparent for the optical signals in the wavelength corresponding to this designated waveguide (i.e. has the bandgap wavelength shorter than the operating wavelength of this designated waveguide). Then, the lower guiding layer could be used to form a waveguide router for lateral re-directing of the optical signal to its designated active waveguide formed in the upper guiding layer, with no or little loss.

The simplest integrated photonics arrangement of the said species is the two-wavelength VWM, in which two designated waveguides operating in wavelengths $\lambda_1$ and $\lambda_2$ ($\lambda_2 > \lambda_1$), hereafter referred to as the first and second wavelengths, respectively, are vertically integrated onto the same substrate, above the common waveguide, which is connected to the shared optical input or output port, such that the designated waveguide with the longer operating wavelength, hereafter referred to as the second designated waveguide, is laterally aligned with, yet vertically separated from, the common waveguide, whereas the designated waveguide with the shorter operating wavelength, hereafter referred to as the first designated waveguide, is laterally and vertically separated from both the common and the second designated waveguides, by using one or the other waveguide re-routing solution, compatible to the VMGI structure design and compliant with overall PIC performance requirements.

In the exemplary embodiments of two-wavelength VWM described below, both designated waveguides are the active waveguides and hence the first designated waveguide, which is laterally decoupled from the common and second designated waveguides, has a dual core guiding layer, such that the lower one is transparent in the first wavelength and can be used for lateral redirecting of the optical signals in this wavelength away from the common and second designated waveguides with little extra loss. Those with the skills in the art will easily see how the same design and operating principles are extended to the case of two passive designated waveguides or any combination of active and passive designated waveguides.

The first embodiment of the invention in the form of the two-wavelength VWM is related to the MGVI structure, in which both the first and the second designated waveguides are photodetectors, therefore enabling for the monolithically integrated two-color receiver with incoming optical signals independently detected in two different wavelengths. In such integrated-photonics arrangement, the layout of the first designated waveguide, which is a waveguide photodetector laterally separated from the common and the second designated waveguides, can be optimized in any conceivable way, e.g. for a higher device responsively and/or speed, without affecting the design or performance of the second designated waveguide. If the photodetector in the first designated waveguide is not laterally separated, not only such optimization could not be possible, but contact metal, which is usually deposited atop the active ridge waveguide, would limit the design and optimization of the second designated waveguide and the VWM as a whole.

In the second embodiment of the invention in the form of the two-wavelength VWM, both the first and the second designated waveguides are edge-emitting semiconductor injection lasers, therefore enabling for the monolithically integrated two-color transmitter, in which outgoing optical signals are independently generated in two different wavelengths. In this integrated-photonics arrangement, the layout of the first designated waveguide, which is an edge-emitting laser laterally separated from the common and the second designated waveguides, can be designed and optimized independently, e.g. for a distributed feedback/reflectance achievable by etching the Bragg grating from the top surface of the ridge on or aside the laser ridge, without affecting the design or performance of the second designated waveguide. Again, if the laser in the first designated waveguide is not laterally separated, the surface etched grating atop or aside the laser ridge, along with the contact metal atop the ridge, would limit design and optimization of the second designated waveguide and the VWM as a whole.

In the third exemplary embodiment of the two-wavelength VWM, the first designated waveguide is the photodetector and the second designated waveguide is the edge-emitting semiconductor injection laser, therefore enabling for the monolithically integrated bidirectional transceiver, in which incoming optical signals are received in the shorter wavelength and outgoing optical signals are transmitted in the longer wavelength. In the particular case of $\lambda_1=1310$ nm and $\lambda_2=1490$ nm, this embodiment relates to a single-fiber bi-directional optical transceiver for OLT applications in time-domain multiplexing (TDM) fiber-to-the-home (FTTH) passive optical networks (PONs). As in the first exemplary embodiment above, the layout of the first designated waveguide, the photodetector, which is laterally separated from the common and the second designated waveguides, can be optimized independently without affecting the design or performance of the second designated waveguide, the laser.

In the fourth exemplary embodiment of the two-wavelength VWM, the first designated waveguide is the edge-emitting semiconductor injection laser and the second designated waveguide is the photodetector, therefore enabling for the monolithically integrated bidirectional transceiver, in which outgoing optical signals are transmitted in the shorter wavelength and incoming optical signals are received in the longer wavelength. In the particular case of $\lambda_1=1310$ nm and $\lambda_2=1490$ nm, this embodiment relates to a single-fiber bi-directional optical transceiver for ONU applications in the TDM FTTH PONs. As in the second exemplary embodiment above, the layout of the first designated waveguide, the laser, which is laterally separated from the common and the second designated waveguides, can be optimized independently without affecting the design or performance of the second designated waveguide, the photodetector.

It would be apparent to one skilled in the art that other combinations of the waveguide photodetector and edge-emitting semiconductor injection laser are possible for receiving and transmitting of the optical signals, respectively, in terms of operating wavelengths, as well as expansion in complexity with multiple wavelengths. It would also be apparent to one skilled in the art that, besides receiving and transmitting, optical functionality integrated along with the VWM can be expanded to include, but not be limited to, amplification, attenuation, switching, and routing. In this manner the VWM can form a generic building block for PIC designs within MGVI platform.

BRIEF DESCRIPTION OF THE DRAWINGS

Exemplary embodiments of the invention will now be described in conjunction with the following drawings, in which.

DETAILED DESCRIPTION OF EMBODIMENTS OF THE INVENTION

Figure 1:
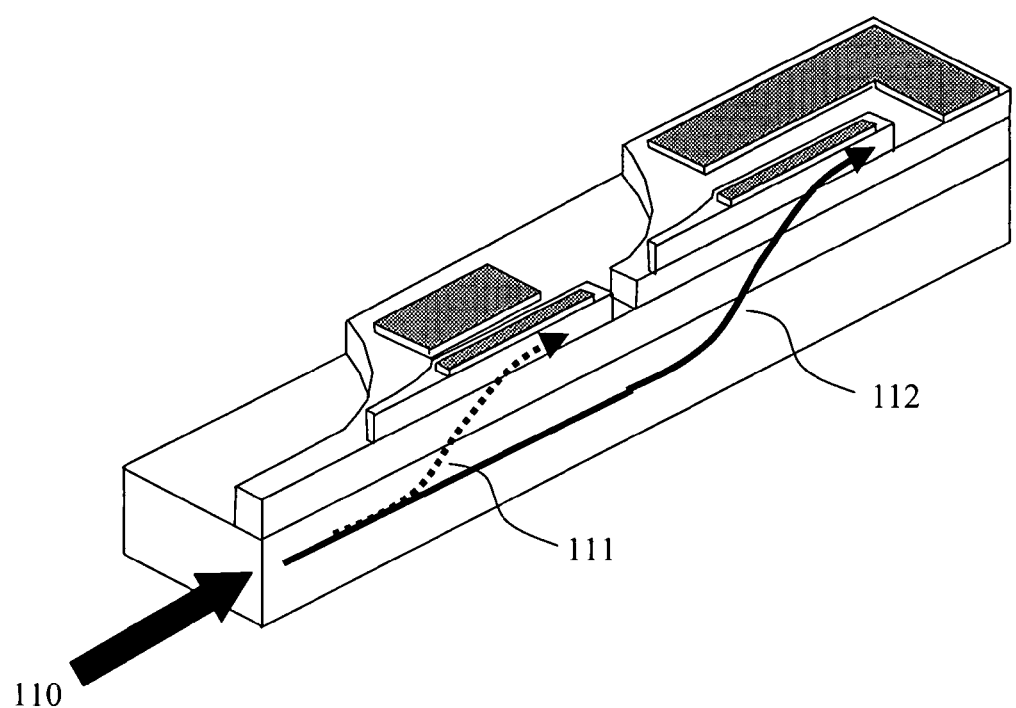
FIG. 1 illustrates prior art in the form of two-wavelength integrated VWM having one common passive and two wavelength-designated active waveguides Tolstikhin et al ("Integrated Vertical Wavelength (De)Multiplexer" U.S. patent application Ser. No. 11/882,126).

It is instructive to start the detailed description of embodiments of the invention with a review of the structure and operating principle of the previous art of a two-wavelength VWM, according to Tolstikhin, (U.S. patent application Ser. No. 60/860,221). Referring to FIG. 1 shown is a schematic three-dimensional view and cross-section of this integrated-photonics arrangement, which features one common passive waveguide 110 and two wavelength-designated active waveguides, 111 and 112, all the waveguides vertically integrated onto the same semiconductor substrate (not shown in the figure) and are differentiated by semiconductor processing steps longitudinally (i.e. in the direction of propagation). In this MGVI arrangement, each waveguide has its guiding layer defined by a bandgap wavelength $\lambda_G$, which is longer than the bandgap wavelengths in the surrounding cladding layers. The bandgap wavelength in the guiding layer of the passive waveguide, $\lambda_{G0}$, is shorter than that of the first designated waveguide, $\lambda_{G1}$, which, in turn is shorter than that of the second designated waveguide, $\lambda_{G2}$, i.e. $\lambda_{G0}<\lambda_{G1}<\lambda_{G2}$. Considering two operating wavelengths ranges, centered on wavelengths $\lambda_1$ and $\lambda_2$, of which the former is shorter than the latter, i.e. $\lambda_1<\lambda_2$, both are longer than the bandgap wavelength in the guiding layer of the common waveguide and close to or below the bandgap wavelengths in the guiding layers of their corresponding designated waveguides, i.e. $\lambda_{G0} < \lambda_{1(2)} \leqq \lambda_{G1(2)}$.

In the MGVI structure illustrated by FIG. 1, at any operating wavelength the guiding layer in each of three waveguides 110 to 112 has its refractive index higher than that in neighboring cladding layers, which is a condition for a vertical confinement of the optical field in and around this layer. Whereas it is necessary, this condition is not sufficient for such a confinement actually to occur. An ability of the guiding layer to support a guided mode also depends on the lateral structure of the waveguide. In particular, said guiding layer in a ridge waveguide laterally defined by a vertical etch always supports at least one guided mode, if the etch stops above this layer (situation, hereafter referred to as the "shallow etch ridge waveguide" or "shallow etch") but does not support any guided mode, if the etch goes through this layer (situation, hereafter referred to as the "deep etch ridge waveguide" or "deep etch"), and the width of the ridge w is narrower than a certain critical cut-off width, $w_{CO}$. The last parameter depends on the wavelength, such that within a MGVI structure composed from III-V semiconductor materials related to InP, for given layer structure and layout of the waveguide, $w_{CO}(\lambda)$ is narrower for a shorter $\lambda$ and wider for a longer $\lambda$. This allows for a wavelength-sensitive guiding, when for a given width of the ridge w, optical fields at the wavelength shorter than $\lambda_{CO}$, determined from the cut-off condition: $w_{CO}(\lambda_{CO})=w$, are guided and those at the longer wavelength are not.

In the waveguide arrangement illustrated by FIG. 1, the first deep etch designated ridge waveguide has the cut-off wavelength of its fundamental mode above the first wavelength $\lambda_1$ but below the second wavelength $\lambda_2$, i.e. $\lambda_1 < \lambda_{CO1} < \lambda_2$, whereas the second deep etch designated ridge waveguide has the cut-off wavelength of its fundamental mode above the second wavelength $\lambda_2$, i.e. $\lambda_{CO2} > \lambda_2$. The first and the second active waveguides can actually guide optical fields in their guiding layers only where these layers are present as a part of the deep etch ridge and where the width of the ridge is greater than the ridge's cut-off width. Therefore, according to Tolstikhin (U.S. Patent Application Ser. No. 60/860,221), by laterally tapering the active waveguide ridges, the necessary and sufficient conditions for an optical mode in the first and second operating wavelengths, $\lambda_1$ and $\lambda_2$, to be coupled into the first and second active waveguides, respectively, can be created at a pre-determined distance along the propagation direction.

The design of the layer structure and layout of the waveguides in accordance to this teaching yields the monolithically integrated VWM, where two optical signals in distinct wavelength ranges, co- or bi-directionally propagating in the common passive waveguide, such as shown by the input signal 110, can be vertically split in two wavelength-designated waveguides, represented by signals 111 and 112. Whereas this is a very generic approach to the wavelength demultiplexing in a MGVI environment, those with the skills in the art can see that it limits the designs of the layout of the first designated waveguide to such that are compatible with the required performance of the deep etch lateral taper, defined at the same level as the first active waveguide. Specifically, the width of the first deep-etched designated waveguide operating in the first wavelength should remain below the cut-off width value for the second wavelength, i.e. $\lambda_2 < \lambda_{CO1}(\lambda_2)$, over the entire length of the first designated waveguide. This may be difficult to implement if the first designated waveguide must have a low-resistance top contact or/and surface-etched grating atop or aside the ridge or/and any other feature of the similar nature that is required by this designated waveguide design. It would be further evident to one skilled in the art that the transfer of the second wavelength 112 cannot be adiabatically coupled until all functional elements associated with the first designated waveguide 111, such as top contact or top/side grating, have been implemented, resulting in a long structure, thereby limiting die count per wafer and increasing component costs.

Figure 2:
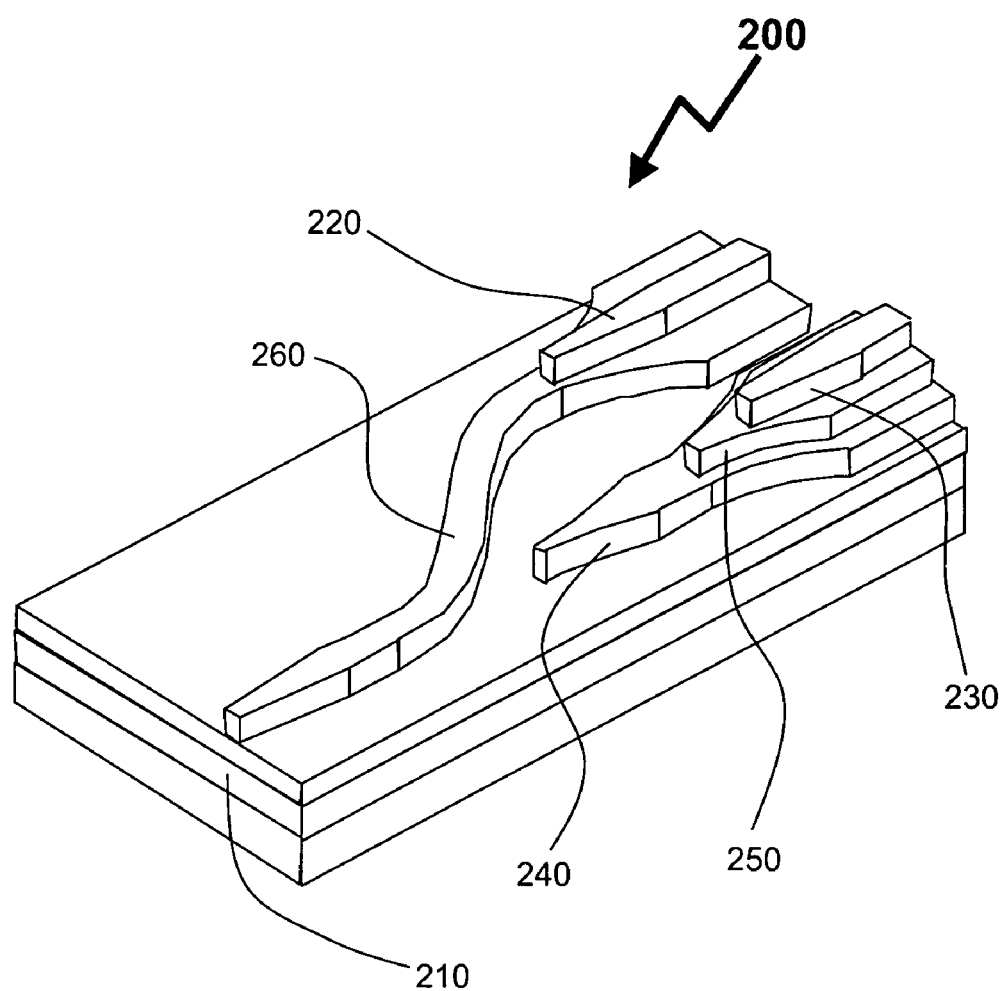
FIG. 2 gives a schematic three-dimensional view of the embodiment of the invention in a form of two-wavelength VWM having one common and two wavelength-designated waveguides, of which the first designated waveguide is both vertically and laterally separated from the common and the second designated waveguide, wherein lateral re-directing of the first (shorter) wavelength is achieved by using a waveguide bend.

The solution to this problem is illustrated by FIG. 2, which gives a schematic three-dimensional view of a first embodiment of the present invention in the form of two-wavelength VWM 200 having one common waveguide and two wavelength-designated waveguides. Whereas the bottom part of this waveguide arrangement is similar to that of the previous art, shown in FIG. 1, there is a fundamental difference in design and operating principle between the two.

Design-wise, the MGVI structure is different in that the guiding layer of the first designated waveguide is now composed of two layers, each capable of supporting the guided mode in the first operating wavelength, of which the lower core layer is transparent for this wavelength (i.e. made up from the semiconductor material having the bandgap wavelength well above the first operating wavelength). Another design difference is in that the waveguide router is formed in the lower core of the guiding layer of the first designated waveguide is lateral, such that once the optical signal in the first (shorter) operating wavelength is vertically split from the optical signal in the second (longer) operating wavelength and is coupled into this layer, it can be laterally re-directed away from the common and first designated waveguides. While the actual design of the lateral router can vary, its role in any embodiment of the VWM disclosed herein remains the same: to separate laterally the optical signals in the first and second operating wavelengths, after they have been already separated vertically. This allows for the layout design of the first and second active waveguides to be optimized independently from each other and, therefore, improves the design flexibility of the VWM and the entire PIC, which it may be a part of. It would also be apparent to one skilled in the art is that the resulting separation of the first operating wavelength allows the functional elements of its designated waveguide to be implemented within the same longitudinal footprint as that used to implement the second adiabatic coupler and the functional elements of the second designated waveguide. As such the two-step VWM 200 is shorter than functionally similar one-step VWM of the previous art, increasing die count per wafer, reducing component costs as well as increasing flexibility in electrical interconnection, component layout etc.

As it concerns to the operating principle, the difference between the two waveguide arrangements illustrated by FIGS. 1 and 2 is in that in the former, spatial separation between the optical signals in the first and second operating wavelengths is achieved by means of only vertical splitting, whereas in the latter, spatial separation between two wavelengths combines both vertical splitting and lateral routing: former, through a processes similar to that described by Tolstikhin in the previous art (U.S. Patent Application Ser. No. 60/860,221) and, later, via lateral re-directing of the first (shorter) wavelength away from the passive waveguide still confining the second (longer) wavelength. This reduces interaction of the second wavelength with the first designated waveguide and, in this way, improves the performance of the VWM and the entire PIC, which it may be a part of.

The key elements of the generic two-step VWM design are illustrated in FIG. 2, where two-wavelength device, 200, is shown comprising a common passive waveguide, 210, first designated active waveguide, 220, and second designated active waveguide, 230, along with two-step lateral tapers, 240 and 250, for the controllable adiabatic transition of the optical signals in the second wavelength from the passive waveguide, 210, into the second designated waveguide, 230. The lateral router for re-directing the first wavelength away from the passive waveguide still confining the second wavelength, in the particular embodiment shown in FIG. 2 is implemented in the form of a waveguide bend 260.

Figure 3:
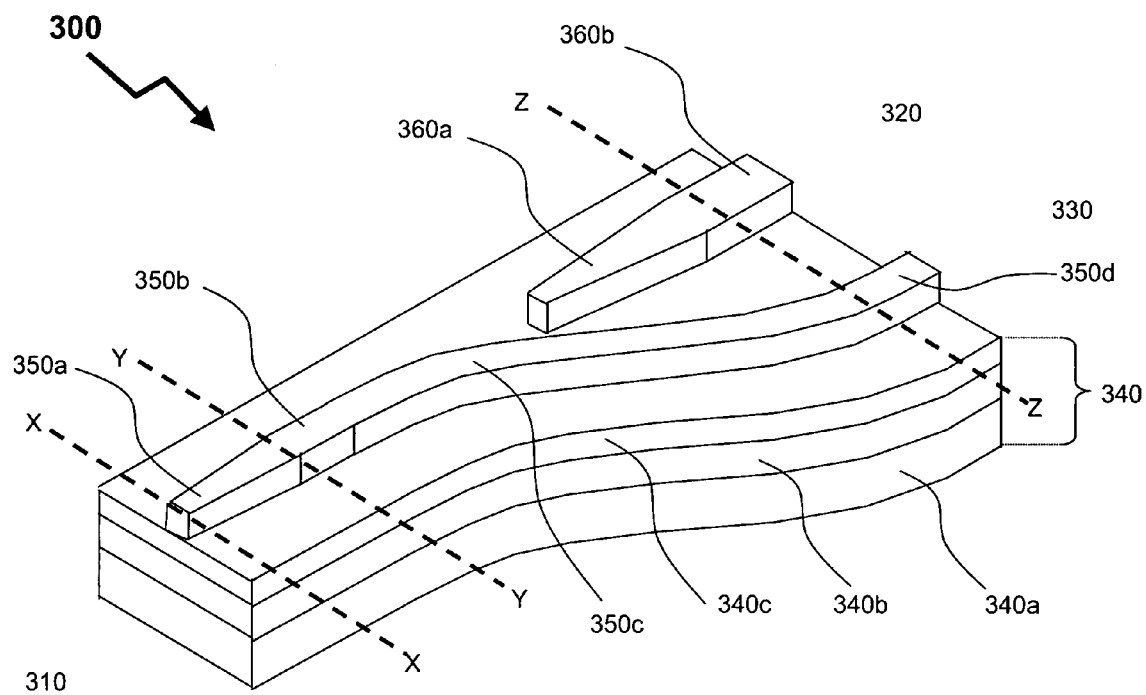
FIG. 3 illustrates the first embodiment of the aspect of the invention related to lateral re-directing of the first (shorter) wavelength after it is vertically split from the common waveguide in the two-wavelength VWM, in which lateral re-directing is achieved by using a waveguide bend.

Referring to FIG. 3 illustrated is a first embodiment of the invention in the form of two-wavelength VWM 300, which is based on use of the waveguide bending for lateral re-directing of the first wavelength after it has been vertically separated from the second wavelength. The major requirements for the bend design being low loss and compactness, which two are not that evidently combined, because of the higher the curvature of the bending, the higher the radiation loss experienced by the optical signal propagating through the bended waveguide section. However, feasibility for a smart waveguide bending design that satisfies both the requirements and compatible with the ridge-waveguide layout of the VWM, has been demonstrated by many in the previous art, e.g. L. H. Spiekman et al, "Ultra small waveguide bends: the corner mirror of the future?" *IEE-Proc.-Optoelectronics*, Vol. 42, PP. 61-65 (1995).

An exemplary MGVI layer structure of the waveguide arrangement shown in FIG. 3, designed for operation in wavelengths $\lambda_1=1310$ nm and $\lambda_2=1490$ nm and implementable in InP-based material system in one-step epitaxial growth on InP substrate, is given in the Table 1.

TABLE 1

Exemplary structure of the passive part of two-wavelength VWM 300 shown in FIG. 3

| # | Layer | Material | Refractive Index 1310 nm | Refractive Index 1490 nm | Thickness (μm) |
|---|---|---|---|---|---|
| 6 | transition waveguide upper cladding | InP | 3.2072 | 3.1770 | 0.450 |
| 5 | transition waveguide core | GaInAsP ($\lambda_G = 1000$ nm) | 3.2742 | 3.2369 | 0.500 |
| 4 | transition waveguide lower cladding | InP | 3.2072 | 3.1770 | 0.250 |
| 3 | etch stop | GaInAsP ($\lambda_G = 1300$ nm) | N/A | N/A | 0.005 |
| 2 | waveguide separation | InP | 3.2072 | 3.1770 | 1.000 |
| 1 | common waveguide core | InP - GaInAsP ($\lambda_G = 1000$ nm) | 3.2106 | 3.1799 | 4.500 |
| 0 | substrate | InP | 3.2072 | 3.1770 | N/A |

As outlined above, the passive optical track of two-wavelength VWM 300 consists of:

a. a common waveguide, comprising layers 0 to 2, which is composed from materials with the bandgap wavelengths well below both operating wavelengths, $\lambda_1$ and $\lambda_2$, and designed to minimize propagation loss in these wavelengths while providing a sufficient evanescent-field coupling into the lower guiding layer of the double-core first designated waveguide, which lower guiding layer hereafter also is referred to as "transition waveguide"; and b. a transition waveguide, layers 4 to 6, transparent in both operating wavelengths and hence also made up from materials with the bandgap wavelengths well below both operating wavelengths, $\lambda_1$ and $\lambda_2$, which is designed to couple the evanescent field of the common waveguide's mode in each of these wavelengths, such that, in use, the transition waveguide's layers can be utilized both for a definition of a shallow etch ridge of the common waveguide, and a deep etch ridge of the transition waveguide.

The first and second active waveguides, 220 and 230, designed for operation in the first and second wavelengths, respectively, are grown atop the passive part of the VWM outlined in the Table 1. For each of the four embodiments of the two-wavelength VWM above featuring two active wavelength-designated waveguides, it is assumed that $\lambda_1$ is shorter than or close to the bandgap wavelength of the upper guiding layer 220 of the first designated waveguide, $\lambda_{G1}$, and $\lambda_2$ is shorter than or close to the bandgap wavelength of the upper guiding layer 230 of the second designated waveguide, $\lambda_{G2}$, but longer than $\lambda_{G1}$, i.e. $\lambda_1 \leq \lambda_{G1} < \lambda_2 \leq \lambda_{G2}$, $\lambda_{G1}$.

Lateral features of the wavelength arrangement illustrated by the FIG. 3 and based on exemplary MGVI structure detailed in the Table 1, such as guiding, tapering and bending all are defined by standard semiconductor etching process, which, referring to the ridge structures, starts at the top surface of the layer 6, goes through the entire transition waveguide stack, and ends after passing through the etch stop layer 3. It should be evident to those skilled in the art of the semiconductor waveguide design that numerous other solutions, based on different material systems (e.g. AlGaInAs—InP or AlGaAs—GaAs) and methods for achieving the required guiding properties. For instance, heterogeneous transparent optical layers composed from alternate lower and higher refractive index materials with a properly adjusted thickness in order to reach a desired value of the effective refractive index can be designed instead of a homogeneous material of similar optical performance, which is difficult to grow at required material composition and thickness.

Figure 4A:
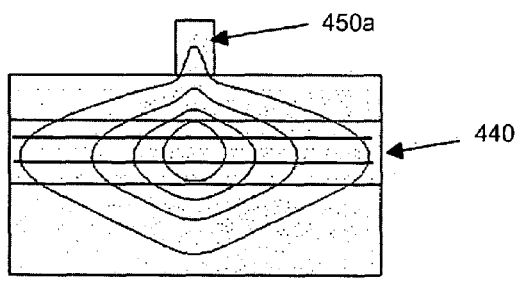
FIG. 4a presents simulated two-dimensional profiles of the optical guided modes in two operating wavelengths, $\lambda_1$ and $\lambda_2$ ($\lambda_1<\lambda_2$), in the common waveguide at the start of the VWM shown in FIG. 3 and having exemplary layer structure detailed in Table 1.
Figure 4B:
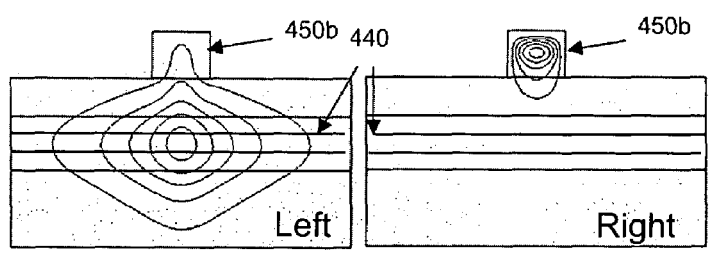
FIG. 4b presents simulated two-dimensional profiles of the optical guided modes in two operating wavelengths, $\lambda_1$ and $\lambda_2$ ($\lambda_1<\lambda_2$), in the middle of the VWM shown in FIG. 3 and having exemplary layer structure detailed in Table 1.
Figure 4C:
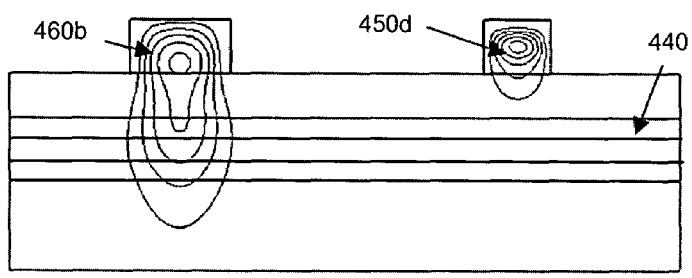
FIG. 4c presents simulated two-dimensional profiles of the optical guided modes in two operating wavelengths, $\lambda_1$ and $\lambda_2$ ($\lambda_1<\lambda_2$), at the end of the VWM shown in FIG. 3 and having exemplary layer structure detailed in Table 1.

The operating principle, generic to any VWM, is now described referring to FIGS. 4a, 4b, and 4c, which present the results of numerical simulations of the two-wavelength VWM embodiments 200 and 300, schematically shown in FIGS. 2 and 3, respectively. Both use the waveguide bend for the lateral router element of the VWM. The layer structure used in the simulations is that of the Table 1 above. Given in FIGS. 4a through 4c are the two-dimensional profiles of the optical field in different cross-sections of the waveguide arrangement shown in FIG. 3.

At one end of the two-wavelength VWM 300, connected to the input/output port shared by both operating wavelengths, optical signals in each of them are confined in the common waveguide at the bottom of the structure. This can be seen from the FIG. 4a, which gives the two-dimensional field profile of the optical mode at the bottom left cross-section X-X of the structure shown in FIG. 3. Vertical confinement in the passive waveguide is ensured by a proper design of the guiding and neighboring layers 0-2, whereas the lateral confinement is provided by the shallow ridge, as defined in the transition waveguide layers 4-6. In either wavelength, the common waveguide is transparent and supports only one two-dimensional mode; the mode's field profile being very similar in both wavelengths such that they are not visibly distinguishable.

The vertical confinement in the common waveguide is chosen to be relatively weak, such that, in use, the vertical mode's evanescent field coupling into the shallow ridge defined in the transition waveguide layers 4-6 enables for a lateral guiding, for one thing, and efficient control of the lateral guiding—through adiabatic adjustment of the ridge's width, for the other. In the passive waveguide section X-X, the ridge is designed to be wide enough for a confident lateral guiding of the optical signals vertically confined in and around the guiding layer but, at the same time, narrow enough for preventing the optical field in either operating wavelength from a vertical confinement in the transition waveguide. By tapering the ridge up, these conditions can be changed for the shorter wavelength, $\lambda_1$, while remaining unchanged for the longer wavelength, $\lambda_2$, such that at a certain width of the ridge the former is adiabatically transferred into the transition waveguide 450b, whereas the latter still is confined into the common waveguide 440. The mechanism of such a transition is similar to that described by Tolstikhin in the previous art (U.S. Patent Application Ser. No. 60/860,221) and based on an ability to control, in the wavelength-selective manner, the vertical transition between the vertically stacked waveguides by means of the lateral tapering, provided the waveguide modes experience normal wavelength dispersion and arranged in an ascending order of the bandgap wavelength in their guiding layer.

The results of adiabatic transition are illustrated in FIG. 4b, which presents the two-dimensional mode profiles of the optical fields in the first (shorter) wavelength and the second (longer) wavelength in a cross-section Y-Y of the quasi three-dimensional view of the waveguide arrangement shown in FIG. 3 obtained by numerical simulations based on the layer structure of the Table 1. It is clearly seen that in this cross-section, the optical field in the longer wavelength (left) still remains localized mainly in the passive waveguide, whereas the optical field in the shorter wavelength (right) is already coupled into the transition waveguide. In other words, cross-section Y-Y represents the complete vertical wavelength split between two operating wavelengths, achieved through adiabatic tapering of the ridge 350.

Once the wavelengths are vertically split, they also can be laterally separated, by using one or the other mechanism for re-directing the light in the first wavelength, confined—vertically and laterally—in the transition waveguide, while the second wavelength is not affected. In the exemplary embodiment illustrated by FIG. 3, this is achieved by using the waveguide bend section 350c inserted between two straight sections of the transition waveguide, 350b and 350d.

To provide lateral guiding to the second wavelength, still vertically confined into the guiding layer of the common waveguide, another section of the transition waveguide is defined co-directionally with the common waveguide. It starts with a lateral taper 360a expanding in a direction towards the second designated waveguide, designed to adiabatically couple the second wavelength into the additional transition waveguide 360b and ensure low-loss propagation towards the second designated waveguide. Once the second wavelength is coupled into the straight section of additional transition waveguide 360b, the two wavelengths are totally separated laterally one from the other.

The result of process above is shown in FIG. 4c, which presents the two-dimensional mode profiles of the optical fields in the first wavelength and the second wavelength in the cross-section Z-Z of the quasi three-dimensional view of the waveguide arrangement shown in FIG. 3, obtained by numerical simulations based on the layer structure of the Table 1. It is evident that at this point the optical field in the longer wavelength (left) is well coupled into the additional ridge formed by the transition waveguide layers, and, at the same time, is well separated laterally from the optical field in the shorter wavelength (right), almost entirely confined in these layers. Therefore, two wavelengths are totally spatially separated, whereas each of them is vertically and laterally confined in a transition waveguide leading to/from its designated waveguide.

Beam propagation simulations, based on the microscopic calculations of the optical properties of multi-layer heterostructures, e.g. as described by Tolstikhin in "Optical properties of semiconductor heterostructures for active photonic device modeling," *J. Vac. Science & Technology A*, Vol. A18, pp. 605-609, 2000, indicate that insertion loss for each of two wavelengths can be minimized to well below 1 dB. For example, referring to the modeled two-wavelength VWM 300 based on the layer structure of the Table 1, the end-to-end insertion loss experienced by the longer wavelength transitioned from the common waveguide to its designated waveguide can be reduced to about 0.5 dB. Therefore, spatial wavelength separation in the two-wavelength VWM 300 can be achieved at reasonably low insertion loss, which, indeed, is another advantage of the present invention.

It would be apparent to those skilled in the art that other mechanisms for the lateral re-directing of the first (shorter) wavelength after it has been split from the second (longer) wavelength by adiabatic transition from the common waveguide into the transition waveguide, other than transition waveguide bending, are also possible. It would also be apparent to one skilled in the art that whilst the two-wavelength VWM 300 has been described in operation as a two-wavelength splitter, other embodiments are possible. For example, following each section 360b and 350d with a waveguide photodetector creates a two-wavelength VWM receiver, as described in the first embodiment of the invention. Operating the structure in reverse provides for a two-wavelength combiner, such that two edge-emitting semiconductor injection lasers combined in a tow-wavelength VWM transmitter, as described in the second embodiment of the invention. Further, implementing one wavelength with a waveguide photodetector and the other wavelength with an edge-emitting semiconductor injection laser allows for two-wavelength VWM bidirectional transceivers, as described above in the third and fourth embodiments of the invention.

Figure 5:
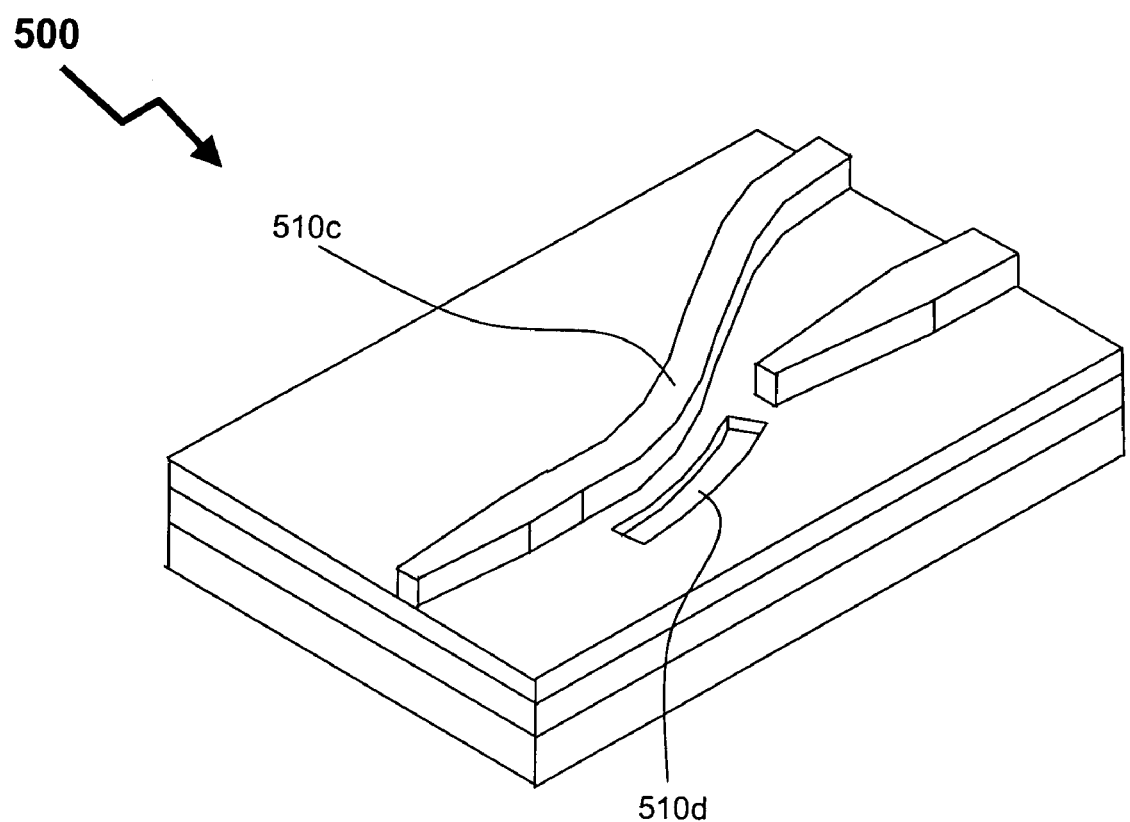
FIG. 5 illustrates the second embodiment of the aspect of the invention related to lateral re-directing of the first (shorter) wavelength after it is vertically split from the common waveguide in the two-wavelength VWM, in which lateral re-directing is achieved by using a waveguide bend complimented with a reflecting deep etch trench next to the waveguide bend.

FIG. 5 illustrates the second embodiment related to the lateral router aspect of the invention, in which the waveguide bend section of the transition waveguide 510c of a two-wavelength VWM 500 is complemented with a curved deep trench 510d, etched in the proximity of the waveguide bending, such that, in use, it provides an additional lateral confinement to the waveguide mode propagating therein and, therefore, reduces its leakage from the bended section of the transition waveguide, therefore, improving the insertion loss for the first wavelength. A combination of the sharp waveguide bending and curved trench, similar to that shown in FIG. 5, has been proven in the previous art to be an efficient solution to a leakage problem occurring at the waveguide bend, see for example Seo et al. ("Low Transition Losses in Bent Rib Waveguides", J. Lightwave Technology, Vol. 14, No. 10, PP. 2255-2259, 1996). Further improvements of the same nature can be achieved by adding continues/segmented trenches on the inner or/and outer side of the waveguide bend.

Figure 6:
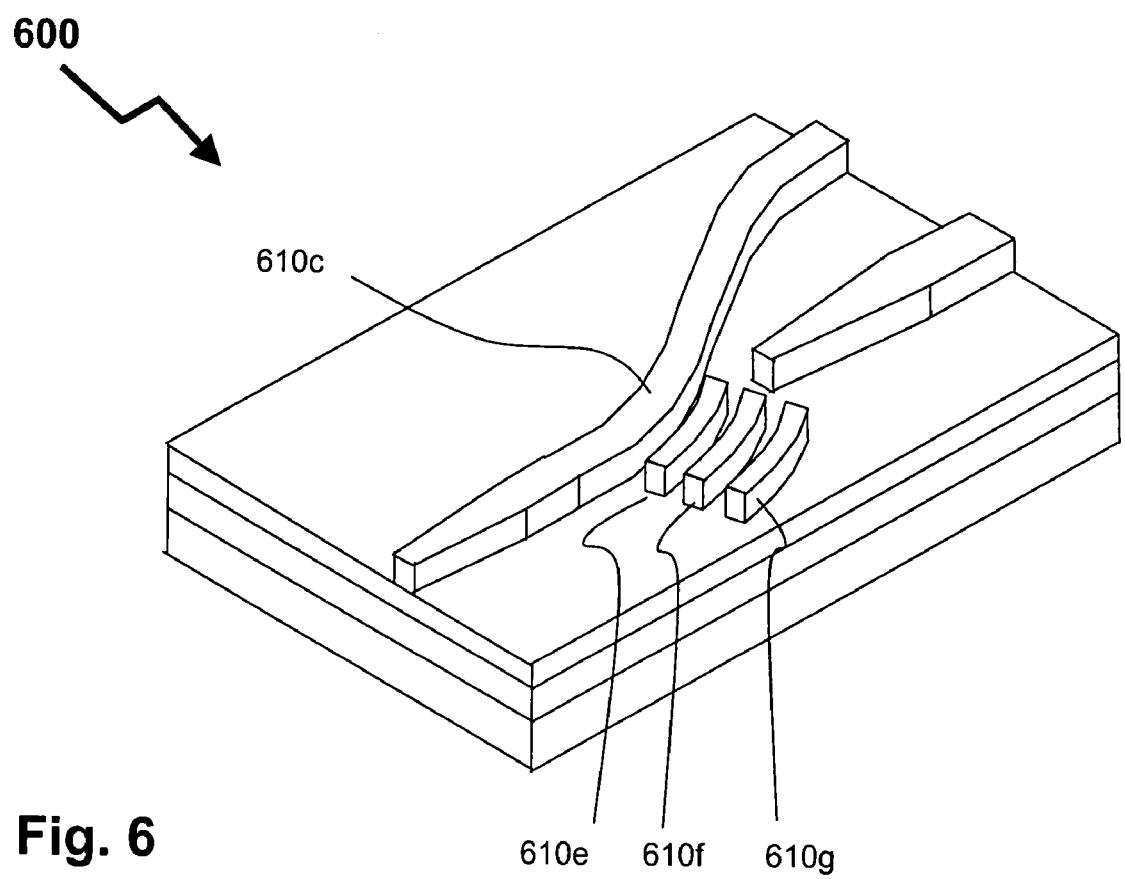
FIG. 6 illustrates the third embodiment of the aspect of the invention related to lateral re-directing of the first (shorter) wavelength after it is vertically split from the common waveguide in the two-wavelength VWM, in which lateral re-directing is achieved by using a waveguide bend complimented with a shallow etch lateral anti-resonant reflecting optical waveguide (ARROW) structure next to the waveguide bend.

Now referring to FIG. 6, illustrated is a third embodiment of the lateral router aspect of the invention, in which the lateral re-direction of the first wavelength still is achieved by bending the transition waveguide 610c, but a lateral ARROW structure 610e through 610g defined by semiconductor etching process next to the waveguide bend is employed as an additional feature serving to reduce the leakage of the optical mode from the bended section of the transition waveguide. The design and operating principles of the ARROW structures 610e through 610g are well described in the previous art, see for example Galarza, et al ("Simple low-loss waveguide bends using ARROW effect", Appl. Physics B, Vol. 80, PP. 745-748, 2005). Bended lateral ARROW structure added on the outer side of the waveguide bend allows for higher bending curvature without extra loss, therefore, enabling for smaller footprint designs.

Figure 7:
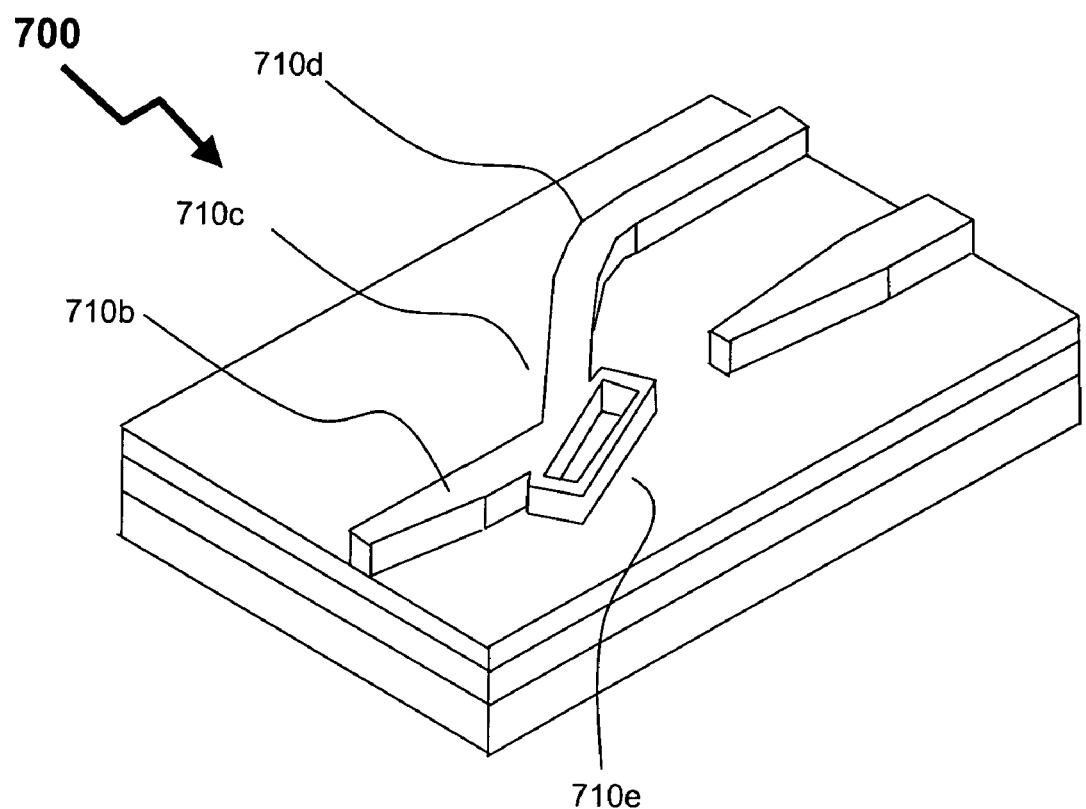
FIG. 7 illustrates the fourth embodiment of the aspect of the invention related to lateral re-directing of the first (shorter) wavelength after it is vertically split from the common waveguide in the two-wavelength VWM, in which lateral re-directing is achieved by using a shallow etch total internal reflection (TIR) mirror.

FIG. 7 illustrates a fourth embodiment of the of the lateral router aspect of the invention, in which mechanism for the lateral re-direction of the first wavelength in the two-wavelength VWM is related to TIR in the angled trench 710e etched between two straight sections of the transition waveguide 710b and 710c. The lateral waveguide router that re-directs the guided optical signals in the first wavelength between the common and first designated waveguides may consist of a TIR mirror 710e and waveguide bend 710d as it is shown in FIG. 7, or another combination of the TIR mirror and the waveguide bend, in which these two elements are positioned in the opposite order relative to the direction of propagation, or two TIR mirrors, one TIR mirror 710e as it is shown in FIG. 7 and the other—instead of the waveguide bend 710d.

It is apparent to those skilled in the art that both co- and bi-directional propagation of the two wavelengths in the passive waveguide track of each of the two-wavelength VWM 300, 500, 600, 700 described above is possible, enabling for the wavelength splitting and combining functions, respectively. In this manner, each of the embodiments of the lateral router aspect of the invention above, 300, 500, 600, 700, can be employed to form a VWM enabling for a two-wavelength receiver or transmitter or transceiver.

Further, it would be apparent to one skilled in the art that the two-wavelength VWM forms a building block for multi-wavelength circuits, wherein multiple VWM elements can be employed to extract and/or add multiple wavelengths or wavelength bands into/out of a common transmission channel. Whilst embodiments are described in respect of two wavelength receivers, transmitters, and bidirectional transceivers, the VWM of the invention can be employed in any other PIC that requires such performances, e.g. wavelength-selective switch or reconfigurable optical add-drop multiplexer. It is also conceivable that in certain photonic circuits, multiple VWM elements may be provided sequentially, with an optional insertion of the semiconductor optical amplifier in between, for insertion loss compensation.

Numerous other embodiments may be envisaged without departing from the spirit or scope of the invention

What is claimed is:

1. An integrated-photonics arrangement implementable in III-V semiconductor material system comprising:
    a semiconductor substrate; the substrate for supporting epitaxial semiconductor growth;
    an epitaxial semiconductor structure grown on the semiconductor substrate; the epitaxial semiconductor structure grown in one growth step, and comprising
    a common designated waveguide; the common designated waveguide being at the bottom of the epitaxial semiconductor structure, and for supporting propagation of optical signals within a predetermined first wavelength range;
    at least one a plurality of the wavelength designated waveguides, each of the plurality of wavelength designated waveguides being above the common designated waveguide, the plurality of wavelength designated waveguides being vertically disposed in order of increasing wavelength bandgap, and each supporting a predetermined second wavelength range, each of the predetermined second wavelength ranges being within the predetermined first wavelength range;
    at least a portion of one of the plurality of wavelength designated waveguides contains a vertical-lateral splitter; the vertical-lateral splitter comprising a vertical element for coupling an optical signal within the predetermined second wavelength range of the one of the plurality of wavelength designated waveguides from the common designated waveguide to the one of the plurality of wavelength designated waveguides and a lateral element for laterally routing the vertically coupled optical signal, and wherein
    the common designated waveguide and the vertical element of the one of the plurality of the wavelength designated waveguides are optically aligned and defined along common propagation direction.

2. An integrated-photonics arrangement according to claim 1 wherein;
    the vertical-lateral splitter forms at least one of a wavelength multiplexer, an optical power splitter, and a wavelength demultiplexer for the optical signal within the predetermined second wavelength range.

3. An integrated-photonics arrangement according to claim 1 wherein;
    the bandgap wavelength of the common designated waveguide is below any predetermined second wavelength ranges of the plurality of wavelength designated waveguides by at least a first predetermined wavelength offset.

4. An integrated-photonics arrangement according to claim 1 wherein;
    the bandgap wavelength of a one of the plurality of wavelength designated waveguides is above the predetermined second wavelength range of the preceding wavelength designated waveguide of the plurality of wavelength designated waveguides, the preceding wavelength designated waveguide being one of the plurality of wavelength designated waveguides vertically disposed below and closest to the selected wavelength designated waveguide by a second predetermined wavelength offset.

5. An integrated-photonics arrangement according to claim 1 wherein;
    the bandgap wavelength of a one of the plurality of wavelength designated waveguides is below the predetermined second wavelength range of the superseding wavelength designated waveguide of the plurality of wavelength designated waveguides, the superseding wavelength designated waveguide being one of the plurality of wavelength designated waveguides vertically disposed above and closest to the selected wavelength designated waveguide by a third predetermined wavelength offset.

6. An integrated-photonics arrangement according to claim 1 wherein;
    for an optical signal coupled into and propagating within the common designated waveguide, the optical signal having an operating wavelength within the predetermined first wavelength range, is adiabatically transferred to the vertical element of the vertical-lateral splitter of the one of the plurality of wavelength designated waveguides without interacting with any other wavelength designated waveguide of the plurality of wavelength designated waveguides, the one of the plurality of wavelength designated waveguides being adiabatically transferred into being selected by the operating wavelength of the optical signal; wherein the operating wavelength of the optical signal therefore is within the predetermined second wavelength range of the one of the plurality of wavelength designated waveguides to which it is adiabatically transferred.

7. An integrated-photonics arrangement according to claim 1 wherein;

an emitted optical signal generated within one of the plurality of wavelength designated waveguides is adiabatically transferred from the vertical element of the vertical-lateral splitter to the common designated waveguide without interacting with any other wavelength designated waveguide of the plurality of wavelength designated waveguides; the emitted signal being within the predetermined second wavelength range of the one of the plurality of wavelength designated waveguides and within the predetermined first wavelength range, and generated within at least one of the second element of the first vertical-lateral splitter, the third element of the first vertical-lateral splitter, and an optical circuit optically coupled to the third element of the first vertical-lateral splitter.

8. An integrated-photonics arrangement according to claim 1 wherein;

each of the plurality of wavelength designated waveguides may be configured as at least one of optical emitter, variable attenuator, transmissive waveguide, variable optical amplifier, and optical detector.

9. An integrated-photonics arrangement according to claim 1 wherein;

at least one of the wavelength designated waveguides within the plurality of wavelength designated waveguides can be configured as an optical emitter and an optical detector according to a bias potential applied to that wavelength designated waveguide.

10. An integrated-photonics arrangement according to claim 1 wherein;

each of the plurality of wavelength designated waveguides is configured as at least one of an optical emitter and an optical detector.

11. An integrated-photonics arrangement according to claim 1 wherein;

the vertical element of the vertical-lateral splitter comprises at least a taper.

12. An integrated-photonics arrangement according to claim 1 wherein;

the lateral element of the vertical-lateral splitter comprises at least one of a straight waveguide, a turning mirror, a reflective mirror, a taper and a curved waveguide.

13. An integrated-photonics arrangement according to claim 12 wherein;

the lateral element of the vertical-lateral splitter further comprises at least one of a trench positioned along at least a portion of one edge of the lateral element by a predetermined distance, at least a series of trenches positioned along at least a portion of one edge of the lateral element by a predetermined distance, a vertical facet etched into a least a portion of the lateral element, and an anti-resonant reflective optical waveguide structure positioned along at least a portion of one edge of the lateral element.

14. A method of providing an optical component comprising:

providing an epitaxial semiconductor structure grown on a semiconductor substrate; the epitaxial semiconductor structure grown in one growth step;

providing a common designated waveguide; the common designated waveguide being at the bottom of the epitaxial semiconductor structure, and for supporting propagation of optical signals within a predetermined first wavelength range;

providing at least one wavelength designated waveguide of a plurality of wavelength designated waveguides, each of the plurality of wavelength designated waveguides being grown above the common designated waveguide, the plurality of wavelength designated waveguides being vertically disposed in order of increasing wavelength bandgap, and each supporting a predetermined second wavelength range, each of the predetermined second wavelength ranges being within the predetermined first wavelength range;

providing within at least a portion of one of the plurality of wavelength designated waveguides a vertical-lateral splitter; the vertical-lateral splitter comprising a vertical element for coupling an optical signal within the predetermined second wavelength range of the one of the plurality of wavelength designated waveguides from the common designated waveguide to the one of the plurality of wavelength designated waveguides and a lateral element for laterally routing the vertically coupled optical signal, the vertical element of the one of the plurality of the wavelength designated waveguides optically aligned and defined along a common propagation direction with the common designated waveguide.

15. A method according to claim 14 wherein;

providing the vertical-lateral splitter comprises providing at least one of a wavelength multiplexer, an optical power splitter, and a wavelength demultiplexer for the optical signal within the predetermined second wavelength range.

16. A method according to claim 14 wherein;

the bandgap wavelength of the common designated waveguide is below any predetermined second wavelength ranges of the plurality of wavelength designated waveguides by at least a first predetermined wavelength offset.

17. A method according to claim 14 wherein;

the bandgap wavelength of a one of the plurality of wavelength designated waveguides is above the predetermined second wavelength range of the preceding wavelength designated waveguide of the plurality of wavelength designated waveguides, the preceding wavelength designated waveguide being one of the plurality of wavelength designated waveguides vertically disposed below and closest to the selected wavelength designated waveguide by a second predetermined wavelength offset.

18. A method according to claim 14 wherein;

the bandgap wavelength of a one of the plurality of wavelength designated waveguides is below the predetermined second wavelength range of the superseding wavelength designated waveguide of the plurality of wavelength designated waveguides, the superseding wavelength designated waveguide being one of the plurality of wavelength designated waveguides vertically disposed above and closest to the selected wavelength designated waveguide by a third predetermined wavelength offset.

19. A method according to claim 14 further comprising;

coupling and propagating within the common designated waveguide an optical signal, the optical signal having an operating wavelength within the predetermined first wavelength range and adiabatically transferred by the vertical element of the vertical-lateral splitter of the one of the plurality of wavelength designated waveguides without interacting with any other wavelength designated waveguide of the plurality of wavelength designated waveguides, the one of the plurality of wavelength designated waveguides being adiabatically transferred into being selected by the operating wavelength of the optical signal; wherein the operating wavelength of the optical signal therefore is within the predetermined second wavelength range of the one of the plurality of wavelength designated waveguides to which it is adiabatically transferred.

20. A method according to claim 14 further comprising;

generating within one of the plurality of wavelength designated waveguides an emitted optical signal that is adiabatically transferred from the vertical element of the vertical-lateral splitter to the common designated waveguide without interacting with any other wavelength designated waveguide of the plurality of wavelength designated waveguides; the emitted signal being within the predetermined second wavelength range of the one of the plurality of wavelength designated waveguides and within the predetermined first wavelength range, and generated within at least one of the second element of the first vertical-lateral splitter, the third element of the first vertical-lateral splitter, and an optical circuit optically coupled to the third element of the first vertical-lateral splitter.

21. A method according to claim 14 wherein;

providing each of the plurality of wavelength designated waveguides comprises providing a wavelength designated waveguide comprising at least one of an optical emitter, a variable attenuator, a transmissive waveguide, a variable optical amplifier, and an optical detector.

22. A method according to claim 14 wherein;

providing at least one of the wavelength designated waveguides within the plurality of wavelength designated waveguides comprises providing a wavelength designated waveguide configurable as an optical emitter and an optical detector according to a bias potential applied to that wavelength designated waveguide.

23. A method according to claim 14 wherein;

providing the vertical-lateral splitter comprises providing at least one of a vertical element comprising at least a first taper and a lateral element comprising at least one of a straight waveguide, a turning mirror, a reflective mirror, a second taper and a curved waveguide.

24. A method according to claim 23 wherein;

the lateral element of the vertical-lateral splitter further comprises at least one of a trench positioned along at least a portion of one edge of the lateral element by a predetermined distance, at least a series of trenches positioned along at least a portion of one edge of the lateral element by a predetermined distance, a vertical facet etched into a least a portion of the lateral element, and an anti-resonant reflective optical waveguide structure positioned along at least a portion of one edge of the lateral element.

* * * * *

UNITED STATES PATENT AND TRADEMARK OFFICE
CERTIFICATE OF CORRECTION

PATENT NO. : 7,444,055 B2  Page 1 of 1
APPLICATION NO. : 11/984759
DATED : October 28, 2008
INVENTOR(S) : Valery Tolstikhin, Yury Logvin and Kirill Pimenov It is certified that error appears in the above-identified patent and that said Letters Patent is hereby corrected as shown below:

Title page: should read;
Item (54), INTEGRATED OPTICS ARRANGEMENT FOR WAVELENGTH (DE)MULTIPLEXING IN A MULTIGUIDE VERTICAL STACK Signed and Sealed this Thirtieth Day of December, 2008

JON W. DUDAS
*Director of the United States Patent and Trademark Office*

UNITED STATES PATENT AND TRADEMARK OFFICE
CERTIFICATE OF CORRECTION

PATENT NO.       : 7,444,055 B2                                          Page 1 of 1
APPLICATION NO.  : 11/984759
DATED            : October 28, 2008
INVENTOR(S)      : Valery Tolstikhin, Yury Logvin and Kirill Pimenov It is certified that error appears in the above-identified patent and that said Letters Patent is hereby corrected as shown below:

Title page: should read;
Item (54) and Column 1, lines 1-3, INTEGRATED OPTICS ARRANGEMENT FOR WAVELENGTH (DE)MULTIPLEXING IN A MULTIGUIDE VERTICAL STACK This certificate supersedes the Certificate of Correction issued December 30, 2008.

Signed and Sealed this

Third Day of February, 2009

JOHN DOLL
*Acting Director of the United States Patent and Trademark Office*